(12) United States Patent
Hank et al.

(10) Patent No.: US 11,795,085 B2
(45) Date of Patent: *Oct. 24, 2023

(54) WATER HYGIENE IMPROVING SYSTEM AND METHODS

(71) Applicant: Seccua Holding AG, Steingaden (DE)

(72) Inventors: Michael Hank, Steingaden (DE); Yannick Buntig, Steingaden (DE)

(73) Assignee: Seccua Holding AG, Steingaden (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/354,025

(22) Filed: Jun. 22, 2021

(65) Prior Publication Data

US 2021/0309552 A1    Oct. 7, 2021

Related U.S. Application Data

(63) Continuation of application No. 16/399,083, filed on Apr. 30, 2019, now Pat. No. 11,053,149.

(60) Provisional application No. 62/664,550, filed on Apr. 30, 2018.

(51) Int. Cl.
| | |
|---|---|
| C02F 9/00 | (2023.01) |
| E03C 1/10 | (2006.01) |
| F24D 3/00 | (2022.01) |
| C02F 1/28 | (2023.01) |
| C02F 1/44 | (2023.01) |
| C02F 3/02 | (2023.01) |

(52) U.S. Cl.
CPC .............. *C02F 9/00* (2013.01); *E03C 1/10* (2013.01); *C02F 1/283* (2013.01); *C02F 1/44* (2013.01); *C02F 3/02* (2013.01); *C02F 2305/06* (2013.01); *C02F 2307/14* (2013.01); *F24D 3/00* (2013.01)

(58) Field of Classification Search
None
See application file for complete search history.

(56) References Cited

U.S. PATENT DOCUMENTS

| | | | | |
|---|---|---|---|---|
| 6,139,739 A | * | 10/2000 | Hamlin | C02F 9/005 210/489 |
| 6,193,886 B1 | * | 2/2001 | Nohren, Jr. | C02F 1/003 222/189.09 |
| 11,053,149 B2 | * | 7/2021 | Hank | E03B 7/04 |

(Continued)

*Primary Examiner* — Chester T Barry

(57) ABSTRACT

A water hygiene improving system and method are provided which may include and utilize one or more water hygiene improving devices which may be coupled to a building water supply network at any number of locations so that water passing through each water hygiene improving device is returned to the building water supply network. The water hygiene improving device may include one or more membrane filtration systems and optionally one or more bioreactors. The system and method include a new and innovative approach for surviving or improving water hygiene within the whole water supply network of new or existing buildings, for prevention of their contamination with *Legionella* or other pathogens, general limitation of biofilm growth and their negative effects on water hygiene, also at point of use (POU), and water distribution within new or existing buildings by limitation of incoming nutrients, bacteria and other microorganisms at point of entry (POE) of buildings or at other locations of the water supply network within the building.

16 Claims, 6 Drawing Sheets

(56) References Cited

U.S. PATENT DOCUMENTS

2015/0348395 A1* 12/2015 Trout .................... G08B 21/20
  340/605
2017/0361276 A1* 12/2017 Muir ..................... B01D 35/30
2018/0201532 A1*  7/2018 McEncroe ............. C02F 9/005

* cited by examiner

WATER HYGIENE IMPROVING SYSTEM AND METHODS

CROSS REFERENCE TO RELATED APPLICATIONS

This application is a continuation of application Ser. No. 16/399,083, filed on Apr. 30, 2019, entitled "WATER HYGIENE IMPROVING SYSTEM AND METHODS", now patented as U.S. Pat. No. 11,053,149, which claims the benefit of U.S. Provisional Application No. 62/664,550, filed on Apr. 30, 2018, entitled "WATER HYGIENE IMPROVING SYSTEM AND METHODS", the entire disclosures of which are incorporated herein by reference for all purposes.

FIELD OF THE INVENTION

The present disclosure relates to a new and innovative approach for surviving or improving water hygiene within the whole water supply network of new or existing buildings, for prevention of their contamination with Legionella or other pathogens, general limitation of biofilm growth and their negative effects on water hygiene, also at point of use (POU), and water distribution within new or existing buildings by limitation of incoming nutrients, bacteria and other microorganisms at point of entry (POE) of buildings or at other locations of the water supply network within the building.

BACKGROUND

Water Conditions

Today, supplied drinking water, containing millions of microorganisms and many important nutrients for biofilm growth, is going into buildings, usually untreated. Within the building water supply network, growing biofilms and their inhabitants often make the water hygiene unsafe. The biofilm within premise plumbing systems is formed out of extracellular polymeric substances by *Legionella* and other microorganisms. *Legionella pneumophila* for example multiply within the biofilm and therefore biofilm and its inhabitants are a potential risk for a contamination with pathogens of the water supply network within buildings.

There are different standard approaches for water hygiene within buildings, like sufficient exchange of the water within the supply pipework or a specific water temperature, which limit the growth of certain pathogenic microorganisms and bacteria within the existing biofilm. Especially high concentrations of *Legionella pneumophila*, which grow particularly well within the water temperatures we use, can endanger the health of people and therefore need to be avoided.

How effective the different strategies and technologies are to limit the growing of biofilm, critical bacteria and microorganisms depends on individual characteristics of the buildings water supply network and the water quality it is getting supplied with. For the water supply network of a building the age and material of the pipe is also an important factor. Supplied water differs in pH, temperature, hardness, inorganic contamination, organic contamination, amount of particles, type of possible waterborne pathogens, other microorganisms like amoeba, total number of bacteria in general and still remaining chlorine residuals of the public water treatment.

About *Legionella*

*Legionella* are naturally occurring and survive in a wide range of environmental conditions. They live in soil, lakes, creeks, and even aquifers. They also survive by consuming the remains of dead bacteria that they come in contact with, which makes old water systems ideal for *Legionella* growth, as there is an ample supply of biomass (a.k.a. "bacteria food"). The *Legionella* bacteria spread in a water system by first attaching to microorganism communities contained in biofilms. A biofilm is a vast array of microorganisms that stick together by excreting a glue-like sludge made of sugars. These communities grow in size as other microorganisms attach to the biofilm, which supplies *Legionella* with plenty of nutrients to continue multiplying. Once the community reaches a sufficient size it cannot hold onto its original mounting point and sloughs off down the waterway, breaking up and spreading the *Legionella* bacteria throughout the water supply.

*Legionella* are able to enter some kind of sleeping-mode, a viable but not cultivable (VBNC) state, where they are still alive but do not multiply and therefore are not detectable by the common plate counting method. Any environmental stress is triggering this VBNC state, where they can still cause disease and from which they can recover their ability to grow.

*Legionella* are protected by the biofilm against any kind of attack or stress and are even able to parasitize and multiply within some species of protozoa, which typically live on the biofilm of the distribution system.

About Risk Management Approaches and Water Safety Plans

To avoid hygienic problems and risks for the users of the water, risk management approaches and technologies are used for the control of *Legionella* growth. Risk management approaches analyze, identify and prioritize potential hazards in regards to put in control measures for each individual hazard. Water safety plans describe the measures, which need to be ensured for each individual building in order to save drinking water conditions.

Stagnation of water always leads to reinforced biofilm and bacteria growth. If the water is exchanged regularly within a short period of time, high concentrations of pathogens are at least not very likely within the aqueous phase, though within the biofilm.

Thermal control involves maintaining the temperature of hot and cold water outside of the range where *Legionella* can grow best, which is between 35 and 46° C. or between 95 and 115° F. If the hot water system is not too contaminated, a constant hot water temperature of 60° C. is sufficient to control *Legionella*, so they are not growing to high concentrations within the aqueous phase. This temperature is not sufficient to kill already existing and established ones within the biofilm.

Technologies to avoid high concentrations of *Legionella* are often dosing systems for disinfectants. When disinfectants like chlorine, monochloramine, chlorine dioxide or copper-silver ions are used, the remaining residual concentration always needs to be sufficient for safe disinfection. Next to the sufficient residual concentration at every outlet, there are limits for disinfection-by-products (DBPs) and there is an acceleration of corrosion of most materials used for the pipe system.

If there is already an outbreak or too high concentrations of *Legionella* for example, there are discontinuously measures like emergency superheat-and-flush disinfection, shock hyperchlorination or point-of-use filtration. All those technologies are effective against *Legionella* to some degree and can minimize the risk of infection short-term, but no one of those is able to kill already existing *Legionella* fully and establish *Legionella* free conditions long-term.

About Dosing of Disinfectants

Chlorine and chlorine-based disinfectants are capable to kill very effectively free occurring bacteria. Hyperchlorination is used in two ways: Shock hyperchlorination, where a high concentration is injected to achieve 20-50 mg/L of free chlorine which will be flushed out after a sufficient contact time, or continuous chlorination, where continuous dosing of chlorine needs to achieve a chlorine residual of 0.5-1.0 mg/L of free chlorine within the water, which is then used and consumed.

Biofilm and protozoa are some kind of physical barrier for *Legionella* against chlorine and other disinfectants. A continued protection against harmful microorganisms like *Legionella* can be reached only, if a sufficient amount of free chlorine maintains in the water as residual chlorine.

Continuous dosing of the allowed amount of chlorine can achieve to keep the numbers of *Legionella* low, however any malfunction of the dosing system will lead to instant growth and high numbers within days. In hot water systems the free chlorine, which is responsible for disinfection, degrades rapidly.

About Superheat-and-Flush Disinfection

For a superheat-and-flush disinfection, the water temperature is raised and all outlets are flushed with the hot water in order to eliminate the critical bacteria. According to current safety guidelines, water used to disinfect pipes must be heated up to 70° C. or 158° F. to kill at least most of the *Legionella* almost instantly. Deep within biofilm, they still can survive and contaminate the whole system again.

There is a rapid recolonization of *Legionella* after a superheat-and-flush disinfection showing that the measure is no long-term solution. In addition to that, the hot water also kills a lot of harmless microorganisms, which then will be perfect nutrients for the surviving ones, especially for *Legionella*, and will lead to an even faster recontamination within the premise plumbing system.

About Point-of-Use Filtration

POU filtration is defined as the use of a device mounted to the outlet of a tap for the purpose of reducing bacterial contamination in drinking water at a single tap. Those devices are used as an emergency measure because they are a physical filtration barrier against *Legionella*, are easily and quickly installed and are a better alternative than prohibition of showering within contaminated buildings. POU filters are also used in hospitals to reduce disease transmission and for an extra protection, especially for immunosuppressed patients.

POU filters are a physical filtration barrier for bacteria and therefore concentrate bacteria and can even promote growth of pathogens within the water supply system of buildings, because the growing bacteria are not getting flushed out no more but stay within the supply system. Failure of filters could lead to the release of high levels of pathogens and that is the reason why they need to be checked and exchanged frequently.

About Ultraviolet (UV) Light Disinfection and Ozone

Ultraviolet light disinfection and treatment with ozone does only work at point of treatment and does not produce any disinfectant residual. That means the water can easily be contaminated again downstream of the treatment, especially within premise plumbing systems with an already established biofilm.

In General

Various measures need to be ensured at the same time and always, otherwise bacteria like *Legionella* are able to grow fast and water becomes unsafe for the usage. All the used technologies show some degree of effectiveness against *Legionella*, but cannot deliver a long-term protection.

The interaction of *Legionella* and amoebae increases the resistance of *Legionella* against high temperatures and the sensitivity to chlorine. That means that the way we approach the problem right now will lead to an even greater and more difficult problem in the future.

Therefore, a need exists for a new and innovative approach for surviving or improving water hygiene within the whole water supply network of new or existing buildings, for prevention of their contamination with *Legionella* or other pathogens, general limitation of biofilm growth and their negative effects on water hygiene, also at point of use (POU), and water distribution within new or existing buildings by limitation of incoming nutrients, bacteria and other microorganisms at point of entry (POE) of buildings or at other locations of the water supply network within the building.

BRIEF SUMMARY OF THE INVENTION

A water hygiene improving system and method are provided which may be configured to protect, maintain or reestablish water hygiene within new or existing buildings to meet health authority standards and regulation requirements by limiting the biofilm and the growth potential for microorganisms, which includes bacteria, viruses, fungi, and other microscopic organism, within the water supply network of buildings through a new approach of using individual combinations of water treatment to removing particles, microorganisms, pathogens and nutrients from the water at point of entry (POE) or at other locations in the water supply network, like the hot water circulation loop or at point of use (POU), of a new or an existing building. Additionally, the water hygiene improving system and method may be used to minimize the risk of water born disease, like *Legionella* disease or nosocomial infections, for inhabitants of new or existing buildings. Furthermore, the water hygiene improving system and method may be used to maintain the real estate value of buildings by keeping their water supply system in good conditions in regards of function and hygiene to prolong its lifetime. Also, the water hygiene improving system and method may be used to protect, maintain or reestablish water hygiene according to health authority standards and regulation requirements by removing particles, microorganisms, pathogens and nutrients out of the water at point of entry (POE) or at other location in the water supply network, like the hot water circulation loop, of a new or an existing building. In this manner, the water hygiene improving system and method may be used to: allow low energy systems to running at their best efficiency without risking water hygiene; compensate technical defects of the existing installation; maximize the efficiency of chlorine residuals and minimize the DBPs; and protect new installed water heating systems against the contamination of existing pipe work.

In some embodiments, a water hygiene improving system may have a water hygiene improving device coupled to a building water supply network so that water passing through the water hygiene improving device is returned to the building water supply network. The water hygiene improving device may optionally include a first bioreactor, and water from the building water supply network may pass through the first bioreactor. The first bioreactor may include a first biofilm, and the first biofilm may be configured to remove a first nutrient from the water passing through the first bioreactor.

In further embodiments, a water hygiene improving device may include a second bioreactor, and water from the building water supply network may pass through the second bioreactor. The second bioreactor may include a second biofilm, and the second biofilm may be configured to remove a second nutrient from the water passing through the second bioreactor.

In further embodiments, a water hygiene improving device may include a membrane filtration system, and preferably the membrane filtration system may include a membrane having a sufficient small pore size in order to provide a log-removal-value of greater than 4 log (99.99%) for microorganisms, more preferably in order to provide a log-removal-value of greater than 4 log (99.99%) for *Legionella*, and more preferably greater than 6 log (99.9999%).

According to another embodiment consistent with the principles of the invention, a method for improving the hygiene of water in a building water supply network via a water hygiene improving device coupled to the building water supply network is provided. The water hygiene improving device may include a first bioreactor having a first biofilm, and water from the building water supply network may pass through the first bioreactor. The water hygiene improving device may also include a membrane filtration system, the membrane filtration system coupled downstream from the first bioreactor, and the membrane filtration system may include a membrane which achieves a sufficient high removal of particles, microorganism and bacteria, preferably greater than 4 log reduction for microorganisms. In some embodiments, the method may include the steps of: passing water from the building water supply network into the water hygiene improving device; removing a first nutrient from the water passing through the first bioreactor via the first biofilm; removing a microorganism from the water passing through the membrane filtration system via the membrane; and returning water from the water hygiene improving device into the building water supply network.

In further embodiments of the method, the water hygiene improving device may include a second bioreactor having a second biofilm, and water from the first bioreactor may pass through the second bioreactor. The method may further include the step of removing a second nutrient from the water passing through the second bioreactor via the second biofilm. In preferred embodiments, the second bioreactor may also be followed by a membrane filtration system for removing bacteria, microorganisms and particles in general.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Figure 1:
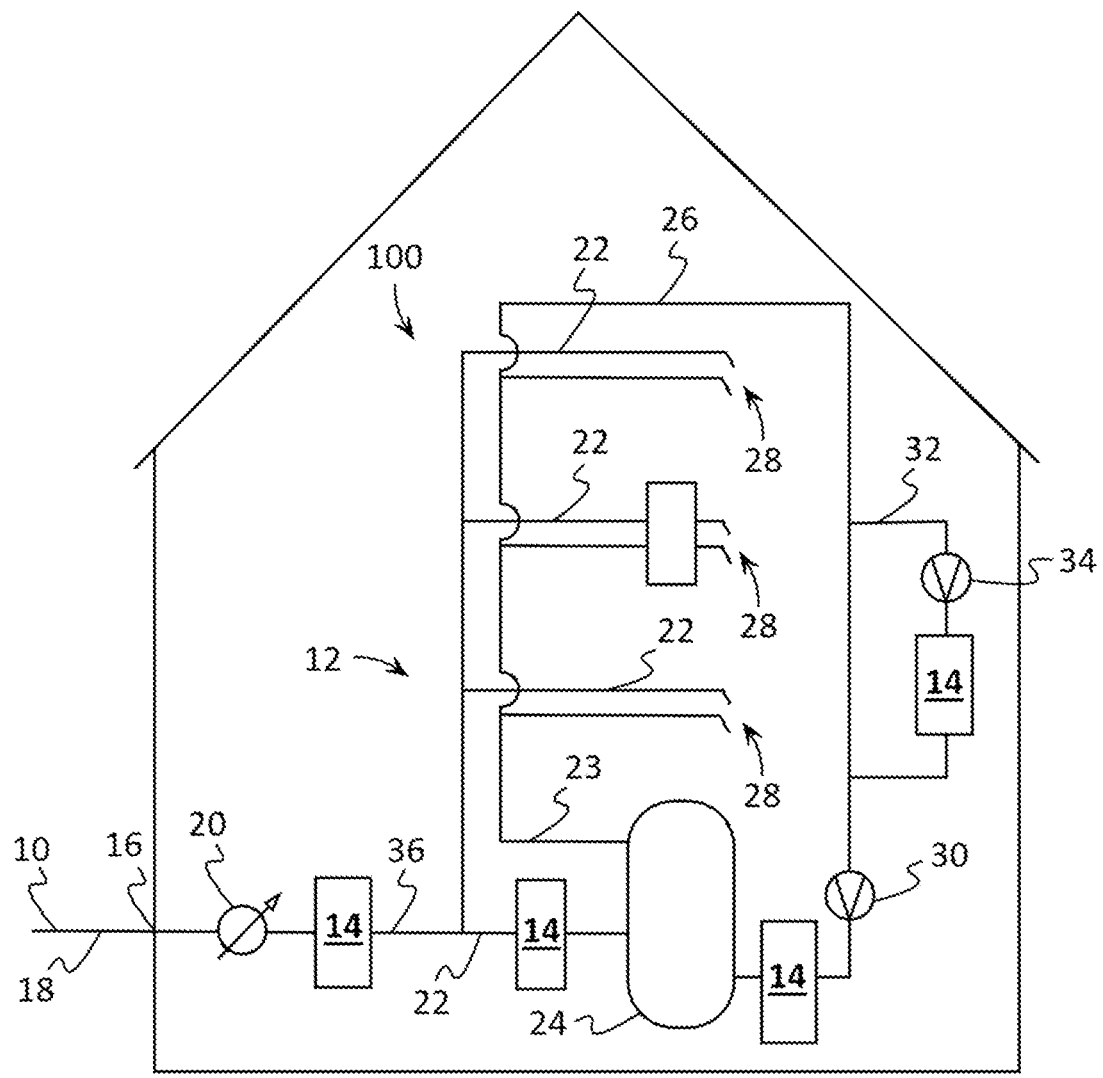
FIG. 1 depicts a block diagram of an example of a water hygiene improving system according to various embodiments described herein.

For purposes of description herein, the terms "upper", "lower", "left", "right", "rear", "front", "side", "vertical", "horizontal", and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Although the terms "first", "second", etc. are used herein to describe various elements, these elements should not be limited by these terms. These terms are only used to distinguish one element from another element. For example, the first element may be designated as the second element, and the second element may be likewise designated as the first element without departing from the scope of the invention.

As used in this application, the term "about" or "approximately" refers to a range of values within plus or minus 10% of the specified number. Additionally, as used in this application, the term "substantially" means that the actual value is within about 10% of the actual desired value, particularly within about 5% of the actual desired value and especially within about 1% of the actual desired value of any variable, element or limit set forth herein.

A new water hygiene improving system is discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

The present invention will now be described by example and through referencing the appended figures representing preferred and alternative embodiments. FIG. 1 illustrates an example of a water hygiene improving system ("the system") 100 according to various embodiments. The system 100 may comprise one or more water hygiene improving devices ("the device") 14 which may be positioned at one or more locations in a building water supply network 12 of new or existing buildings or any other water supply network 12.

Drinking water, supplied via the public water distribution system 10, is not sterile and is coming into the building water supply network 12 together with tens of thousands of bacteria and other microorganisms in each milliliter of water. This water also includes quantities of nutrients which may be utilized by the bacteria and other microorganisms which live within the biofilms growing on all liquid-solid boundaries. This nutrient intake leads to a great growth potential for all kinds of bacteria and other microorganisms within the building water supply network 12 and often result in conditions where the hygiene of the drinking water does not meet health regulations standards.

Public water 18 from the public water distribution 10 typically travels a long way before it reaches the supply network of a city or town and then the point of entry (POE) 16 of a building. When this water from the public water distribution 10 arrives, it is not sterile and may contain between 10,000-200,000 microorganisms in each milliliter. A larger percentage of the microorganisms are in some kind of sleeping-mode, called "viable but non culturable" (VBNC), where they are currently not multiplying and therefore are not detectable by the standard plate counting method, but where they are waiting for "better conditions" to settle down and start multiplying again. Within this cocktail, most of the microorganisms are harmless and only a few are pathogens. All those different microorganisms create a biofilm together, which then becomes their community, home and protection against all kinds of threads. The public water 18 also contains a lot of nutrients for those microorganisms like nitrate, iron and phosphor for example.

Downstream of the individual water hygiene improving system 14, the treated water 36 contains close to no microorganisms and only limited amount of nutrients available for microorganisms, and therefore only limited growth potential for still existing microorganisms.

The still remaining microorganisms downstream of individual water hygiene improving system 14 may now not have the community they need to establish a viable biofilm and therefore may be limited in their potential of growth and multiplying. This leads to very low concentrations of microorganisms within the building water supply network 12 especially within new buildings. The risk of a contamination with pathogens may then be extremely low. Even already established biofilms in existing buildings may lose the amount of nutrients that they were previously accustomed to be supplied with through the individual water hygiene improving system 14 upstream, and the still existing bacteria and other microorganisms may consume the nutrients which may still be included within the biofilm and therefore may start to consume the biofilm itself. This may lead to a shrinking biofilm and therefore to decreasing numbers of bacteria and other microorganisms within the whole building water supply network 12.

For new buildings and their building water supply network 12, the goal may be to fully protect the hygiene of the new water pipe network, so that bacteria and other microorganisms together with their nutrients, which could potentially risk hygiene of water within the building, may be sufficiently removed and may not be able to create a hygiene problem. Through this prevention, critical bacteria like *Legionella* may not even be entering the new pipe work for the very first time or at least in such small numbers with too less nutrients, so they may be not able to being established within the biofilm.

By not letting in the mass of microorganisms, particles and nutrients into new building water supply network 12, the growth of biofilm and the risk of water hygiene issues may be limited from the very beginning. All tiny particles like hard-water flakes or rust sediments may also be removed. The pipes inside of a building may stay cleaner in the long-term and the forming of critical biofilms may be prevented. Furthermore, the investment of the real estate and its building water supply network 12 may be conserved and protected. Experience shows that without this proactive innovative approach and its individual water hygiene improving system 14, it is very hard to meet hygiene regulations during the whole lifetime of a building, or even after a few years of runtime. A lot of energy and resources are spent trying to always meet those regulations, which may be saved through this innovative approach and the use of the individual water hygiene improving system 14.

If critical bacteria like *Legionella* are not established for the first time, temperature may not necessarily always need to be that cold for the cold water line 22 or that hot for the hot water line 23 in order to avoid the critical temperature range of growth to meet hygiene standards. Through this proactive prevention, heat pumps and low-energy heating systems may be able to run at their highest efficiency without endangering the hygiene of the building water supply network 12.

In existing buildings, even if the first contamination of bacteria and other microorganisms has already taken place, device(s) 14 of the system 100 may be used to improve hygiene of existing buildings and their building water supply network 12 by functioning as an appropriate barrier for particles and potential nutrients within the individual water hygiene improving system 100 preferably at point of entry (POE) 16, so that nutrients for already existing populations and biofilms may be limited and new contamination from the public water distribution 10 line may be prevented.

Through this innovative approach it may even be possible to compensate for existing technical defects, like old and inefficient isolation for example, and to achieve stable, sustainable operation of the system, which may then preserve the value of the building. Additionally, the pre-emptive and innovative approach may prevent new contamination with *Legionella* and may protect tenants and users from *Legionella* disease or nosocomial infections, according to Drinking Water Regulation.

At the individual outlet 28, the biofilm and the growth potential for bacteria and other microorganisms may be minimal. This leads to very low concentration of bacteria and other microorganisms in general and therefore the risk of potential growth of pathogens may be avoided. This may make it much easier to meet the hygiene requirements of the health department and drinking water regulations.

Within the building water supply network 12, downstream of the established individual water hygiene improving system 14, chlorine residuals, already existing within the public water 18 from the public water distribution 10 or newly dosed within the building, may remain much longer and may work more efficient because they may not getting consumed by all the harmless microorganisms or other substances, which were removed previously by the established individual water hygiene improving system 14 at point of entry (POE) 16. By using less disinfectants and having less consumptions of chlorine residuals, chlorine by-products like, Trihalomethanes (THMs) may be decreased.

The individual water hygiene improving system 14 at point of entry (POE) 16 may protect the building water supply network 12 additionally against so called "brown water events", where through construction work on the public water infrastructure incrustations, particles and biofilms may get mobilized, which would normally end up being flushed into the building water supply networks 12.

In some embodiments, in order to protect the building water supply network 12 from this intake, or to stop the supply of nutrients to the biofilms and its inhabitants, a device 14 may be placed at one or more points of entry (POE) 16 of the building water supply network 12 to remove or reduce the incoming amount of bacteria and other microorganisms and nutrients so that the water hygiene downstream of this device 14 may be improved for existing buildings or may be saved for new buildings in the long term. Depending on the goal, two or more devices 14 may use different treatment steps.

Downstream of a device 14, the water may contain close to no bacteria and other microorganisms and a very limited amount of dissolved nutrients for critical bacteria and other microorganisms and therefore only a minimized growth potential for biofilm and its inhabitants, which could endanger the water hygiene within the building water supply network 12.

Within the whole building water supply network 12, the growth potential for bacteria and other microorganisms may be minimized in general and the normal intake of new bacteria and other microorganisms may be prevented. Therefore, water hygiene may be improved for existing buildings and saved for new buildings via the device(s) 14 of the system 100.

FIG. 1 shows the different locations within the building water supply network 12 of a new or existing building, where the individual water hygiene improving system 14 may, but not necessarily, be positioned or located.

The location where the public water 18 is going from the public water distribution 10 system into the building water supply network 12 may be referred to as a point of entry (POE) 16. Typically, a water meter 20 is installed at the POE 16 to measure the amount of water the inhabitants of the building are consuming and at this point is typically also the separation of the responsibility for the water hygiene, going from the public water supply to the building owner and building operator.

In preferred embodiments, the system 100 may comprise a device 14 coupled to a building water supply network 12 proximate to the POE 16, such as after a water meter 20. In this manner, the system may be used to improve and later save water hygiene within new or existing buildings so that all the water entering the building water supply network 12 may pass through the device 14 which may sufficiently remove incoming particles, bacteria and other microorganisms, and their nutrients to avoid first time contamination or to limit the already established biofilm and the growth potential of bacteria and other microorganisms within it.

In further embodiments, the system 100 may comprise one or more device 14 which may be positioned anywhere on one or more water lines 22, 23, to improve water exiting the devices 14 by limiting microorganisms and their growth potential and by limitation of their nutrients. In some embodiments, a device 14 may be positioned on a cold water line 22 after the water meter 20 so that all water entering the building may be improved by the water hygiene improving system 14. In further embodiments, an individual water hygiene improving system 14 may be positioned on a cold water line 22 upstream of a water heater 24 so that cold water entering the water heater 24 may be improved by the individual water hygiene improving system 14. In further embodiments, an individual water hygiene improving system 14 may be positioned on a hot water bypass 32 before or after an extra pump for part stream 34 so that water before or after an extra pump for part stream 34 may be improved by the individual water hygiene improving system 14.

Especially within the hot water circulation loop 26 of existing buildings, typically a massive biofilm is created through which bacteria and other microorganisms find perfect nutrient conditions and good protection sufficient for multiplying. This water is then supplied to all the taping points or outlets 28, where the high concentration of bacteria and other microorganisms together with parts of the mobilized biofilm then contaminate those outlets 28. If the water is not exchanged regularly, high concentrations of microorganisms, such as for example *Legionella*, are generated and endanger the water hygiene of the building water supply network 12 and any inhabitants.

In some embodiments, the system 100 may comprise one or more devices 14 which may be configured to improve and later save water hygiene within the hot water system of buildings by having a device 14 in communication with the hot water circulation loop 26, working full stream, to remove particles, microorganisms, pathogens and nutrients from the already established biofilm and microorganisms. In some embodiments, a device 14 may be positioned on a hot water circulation loop 26 which may recirculate hot water back to the water heater 24 so that hot water entering the water heater 24 may be improved by the device 14. In further embodiments, the device 14 may be introduced within hot water circulation loop 26 downstream of the hot water circulation pump 30 delivering the water back into the water heater 24.

In some embodiments, within the hot water circulation loop 26, the device 14 may decrease and limit the concentration of bacteria and other microorganisms. By removing the circulating biomass and nutrients, a process of ongoing improvement of the water quality starts within the building water supply network 12. Old and existing hot water circulation loops 26, which are full with biofilm and high concentration of even pathogens like *Legionella*, may recover by the removal of microorganisms, their nutrients or mobilized particles like rust and biofilm pieces.

During renovation, new water heaters 24 may also be protected against the recontamination from the existing hot water circulation loop 26 by the system 100 by positioned a device 14 upstream of the new water heater 24. In this scenario, a device 14 may be installed on a hot water circulation loop 26 just before the water heater 24 or other location where water has exited out of the hot water circulation loop 26.

In some embodiments, the device 14 is located within the cold water line 22, which feeds the water heater 24, in order to protect its hygiene and the hygiene of the whole hot water line(s) 23 and the hot water circulation loop 26 downstream.

In some embodiments, the system 100 may comprise a device 14 which may be used as a barrier between an existing part of a building and a new part of the building to avoid contamination from the existing building water supply network 12 into the new one.

In some embodiments, the system 100 may comprise a device 14 which may be in communication within the hot water circulation loop 26 and may be positioned in a bypass 32, treating only some amount of the circulating water from the hot water circulation loop 26 in order to reduce bacteria and other microorganisms and nutrients sufficiently just down to an amount needed to meet regulation requirements. Here, pump 34 for the bypass 32 may be used in order to control the amount of water, which is going through the device 14 and therefore through the bypass 32.

In some embodiments, the system 100 may comprise a device 14 which may be positioned on the water line 22, 23, supplying either or both a cold and a hot outlet 28 at point of use (POU). There may be areas in a building water supply network 12, which need to be protected in a very rigorous manner, for example at outlets 28 within a hospital building. In further embodiments, an individual water hygiene improving system 14 may be positioned on a cold water line 22 and/or a hot water line 23 upstream of cold water and/or hot water outlets 28 so that cold water and/or hot water dispensed from one or both of the outlets 28 may be improved by one or two devices 14.

Figure 2:
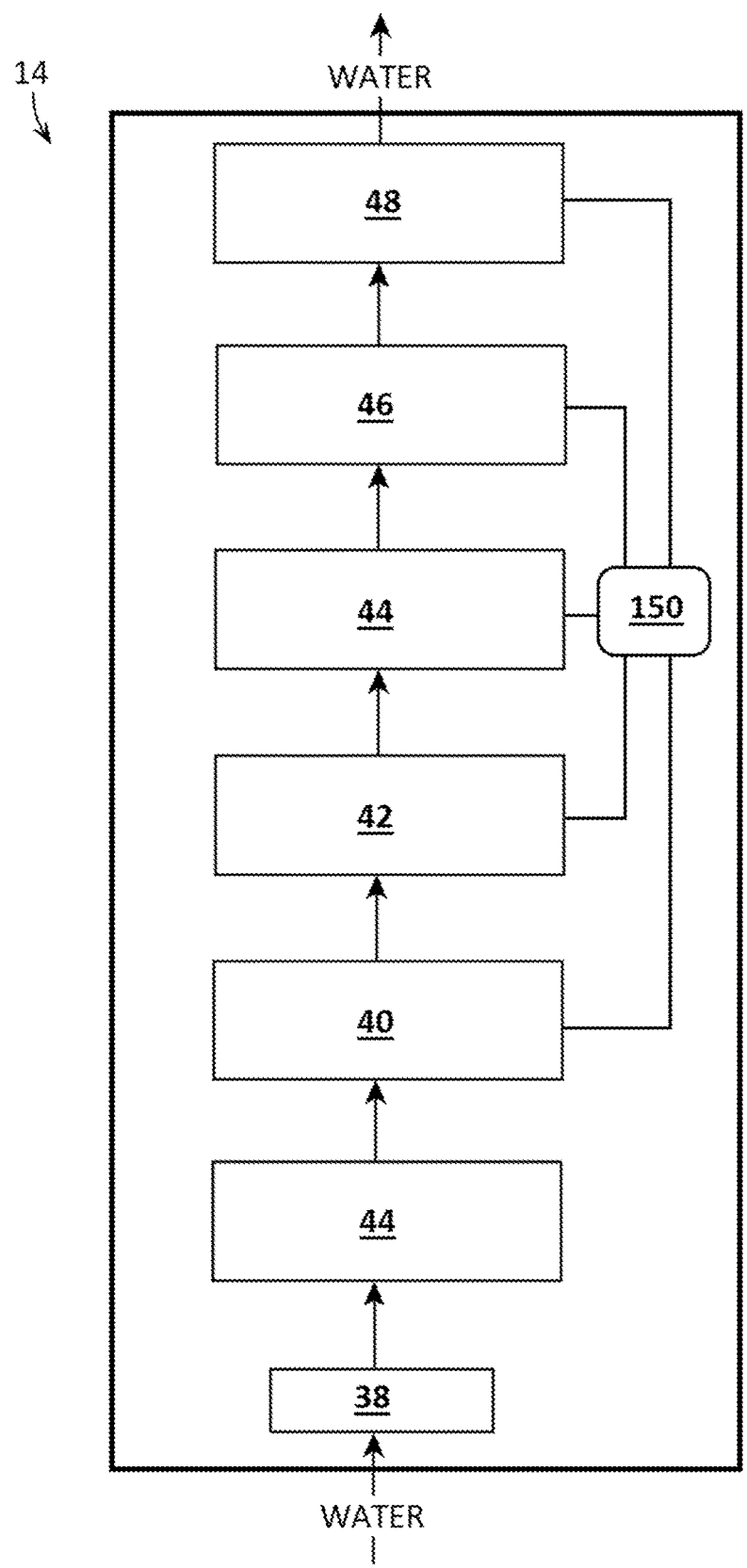
FIG. 2 illustrates a block diagram of an example of a water hygiene improving device according to various embodiments described herein.

FIG. 2 shows a block diagram of some example components of a water hygiene improving device 14 according to various embodiments and also depicting an example of a possible arrangement and the possible different treatment steps for the device 14. In some embodiments, the system 100 may comprise one or more devices 14 which may be configured to improve the water hygiene of a building water supply network 12 by reducing microorganisms and nutrients within the building water supply network 12.

In some embodiments, the device 14 may comprise a controller 150 which may be in communication with one or more components, such as a first bioreactor 40, a second bioreactor 42, a buffer tank 46, and a membrane filtration system 48, so that the controller 150 may control one or more functions of the components 40, 42, 44, 46, 48. In preferred embodiments, a controller 150 may comprise a master programmable logic controller (PLC). In further embodiments, a controller 150 may comprise a computing device having one or more processors and/or logic chips. In still further embodiments, a controller 150 may comprise any other device for controlling the functions of one or more components of the device 14.

In some embodiments, a device may comprise one or more pre-filters 38. Water entering the device 14 may pass through a pre-filter 38 which may provide the first treatment step for the water. Generally, a pre-filter 38 may be configured to remove relatively larger particles from the water entering the device 14 to avoid malfunctions of the downstream working treatment equipment and to cut off the first amount of biomass. The mesh size of this pre-filter 38 may be between 1 to 1000 µm, and more preferably approximately 10 to 100 µm.

After passing through a pre-filter 38, the water may then be communicated to an optional granulated activated carbon filter 44 and/or a first bioreactor 40. In preferred embodiments and as shown in FIG. 2, after passing through a pre-filter 38, the water may then be communicated to a granulated activated carbon filter 44 and then to a first bioreactor 40. In other embodiments, after passing through a pre-filter 38, the water may then be communicated to a first bioreactor 40 and then to a granulated activated carbon filter 44.

One or more of the components (38, 44, 40, 42, 44, 46, 48) of the device 14 may be optional and may be arranged in any order and configured to remove microorganisms, such as bacteria, particles, nutrients, and other items from water entering the device 14. In preferred embodiments, one or more of the components (38, 44, 40, 42, 44, 46, 48) may be to limit the incoming nutrients in general and especially for the critical pathogens, or for those microorganisms which are needed by the critical pathogens in order to then achieve conditions where the critical pathogens do not multiply no more, or at least only in very small numbers which may be not critical for meeting drinking water guidelines. The components (38, 44, 40, 42, 44, 46, 48) may be coupled upstream and downstream from each other. A first component (38, 44, 40, 42, 44, 46, 48) that may be coupled downstream to a second component may receive water from the second component. Also, in this manner, the second component is coupled upstream to the first component.

In some embodiments, a water hygiene improving device 14 may comprise a prefilter 38, a first bioreactor 40, a second bioreactor 42, a first granulated activated carbon filter 44, a second granulated activated carbon filter 44, a buffer tank 46, and/or a membrane filtration system 48. In further embodiments, a prefilter 38 may be coupled upstream from a first granulated activated carbon filter 44 and/or a first bioreactor 40. In further embodiments, a first granulated activated carbon filter 44 may be coupled upstream from a first bioreactor 40. In further embodiments, a first bioreactor 40 may be coupled upstream from a second bioreactor 42. In further embodiments, a second bioreactor 42 may be coupled upstream from a second granulated activated carbon filter 44, a buffer tank 46, and/or a membrane filtration system 48. In further embodiments, a second granulated activated carbon filter 44 may be coupled upstream from a buffer tank 46 and/or a membrane filtration system 48. In further embodiments, a buffer tank 46 may be coupled upstream from a membrane filtration system 48.

For the reduction or removal of nutrients in general and especially for the critical nutrients, a device 14 may comprise a first bioreactor 40, in which bacteria and other microorganisms may be cultivated in order to consume those nutrients. The cultivation of a natural biofilm 58 within a bioreactor 40, 42, with the nutrients consuming bacteria and other microorganisms may be formed naturally simply by supplying a suitable surface and using the incoming bacteria and other microorganisms from the public water 18 to colonize the surface, and/or by creating certain colonies of crated biofilms 60 within a bioreactor 40, 42, which then may be introduced into a bioreactor 40, 42, which are able to realize the reduction of one or more specific nutrients. In some embodiments, the device 14 may comprise two or more bioreactors 40, 42, so that the device 14 may be configured as a multistage bioreactor. For example, the device 14 may comprise a second bioreactor 42 which may be configured to reduce or eliminate one or more different nutrients than the first special bioreactor 40 is configured to reduce or eliminate. As an example scenario, the device 14 may comprise a second bioreactor 42 which may only be able to reduce certain nutrients because the first bioreactor 40 reduced certain other nutrients from the water that is supplied to the second bioreactor 42 from the first bioreactor 40.

In alternative embodiments, the reduction of dissolved substances and nutrients may also be realized by the device 14 having a granulated activated carbon filter 44 downstream of the first bioreactor 40 or instead of it.

In preferred embodiments, a bioreactor may comprise a biofilm media 61 that may provide a culturing surface 57 which may be configured to influence the growth potential of one or more desired bacteria and other microorganisms on this culturing surface 57 in a positive way, so that desired microorganisms may grow and live on the culturing surface 57 to consume desired incoming nutrients in the water passing through the device 14, such as nitrate for example, so that the nutrients may no longer exist or may be very limited downstream of the bioreactors 40, 42, of the device 14. The main function of a culturing surface 57 of the biofilm media 61 of a bioreactor 40, 42, may be the supply of a solid-liquid interface on which biofilm may grow and consume critical nutrients from the passing water. In some embodiments, a culturing surface 57 of a biofilm media 61 may comprise a hydrophobic material which may form the solid-liquid interface. Generally, hydrophobic materials provide better attachment conditions for bacteria and other microorganisms than hydrophilic materials. In further embodiments, a culturing surface 57 of a biofilm media 61 may comprise granulated activated carbon or some other granulated material that may also have a porous structure, which may increase the surface area of the material and therefor the surface area of the culturing surface 57 where biofilm 58, 60, may grow in order to consume nutrients. The pore density may be as high as possible and the pores may preferably be mesopores, however any other pore sizes may be used including macropores and/or micropores.

In some embodiments, a culturing surface 57 of a biofilm media 61 may comprise a material that may supply needed nutrients to make sure that the microorganisms living there may be able to consume as much of the "critical nutrients" as possible. In further embodiments, a granulated activated carbon filter 44 may be configured to remove or reduce dissolved organic carbons. In further embodiments, the critical nutrients may be removed by using a bioreactor 40, 42, in which bacteria and other microorganisms of a biofilm 58, 60, may consume critical nutrients such as nitrate and where missing and limiting nutrients, such as phosphate, may be delivered or supplied into the bioreactor 40, 42, for more effective consumption of other unwanted "critical nutrients". If there are required nutrients missing, which then limit the consumption of the microorganisms in general, those nutrients may be taken from or supplied by the culturing surface 57 material. Therefore, the media 61 may even supply the organisms of the biofilm 58, 60, with specific nutrients. Those nutrients may be either coded on the culturing surface 57, as a conditioning film, or may be stored in the volume of the material itself where they leak through diffusion out of the material. Examples for those nutrients which could be provided may be, but not exclusively are, trace elements like calcium, magnesium, sodium, potassium, ferric, or other cations, but also nutrients like nitrate, phosphate, glucose, lactose, mannose, galactose, and glycerin.

The culturing surface 57 of the material itself may have a certain roughness, which may boost the diffusion of nutrients out of the material to support the connected biofilm and its bacteria and other microorganisms with their metabolism. This roughness may be described with a certain contact angle between the material and the water or biofilm, which may, but not necessarily, be between 50-110 degrees. In preferred embodiments, a culturing surface 57 of a bioreactor 40, 42, may be formed of a material having a contact angle between the material and water contacting the material in which the contact angle may be between approximately 50 and 110 degrees.

The biofilm 58, 60, which may be used within a bioreactor 40, 42, may optionally either be cultivated "naturally" on the media by the incoming public water 18 (natural biofilm 58), or may be cultivated elsewhere and may be introduced then into the special bioreactor 40 (created biofilm 60), or a combination of both.

In some embodiments, a device 14 may comprise one or more storage or buffer tanks 46. Downstream of the one or more bioreactors 40, 42, and/or granulated activated carbon filters 44 which may be configured for the reduction of dissolved nutrients, it may be necessary to introduce some storage or buffer tank 46, for example through membrane expansion tanks or similar, in order to realize a longer retention time within the one or more bioreactors 40, 42, and/or granulated activated carbon filters 44 for better and more efficient nutrients reduction within them, and still be able to deliver the demand of peak flow for the building water supply network 12.

In some embodiments, a device 14 may comprise one or more membrane filtration systems 48. In addition and/or in place of removing nutrients for bacteria and other microorganisms from the water, it may be necessary to remove the incoming bacteria and other microorganisms themselves to cut off the intake of those bacteria and other microorganisms in parts of the building water supply network 12 downstream of a device 14 to be able to establish stable good water hygiene conditions in the long term. As an example, it may be desired to sufficiently remove amoeba from the water in order to avoid the growth potential of *Legionella* in the building water supply network 12, in which the *Legionella* may need amoeba in order to multiply.

In some embodiments, the removal of bacteria and other microorganisms by a device 14 may be realized via one or more membrane filtration systems 48. A membrane filtration system 48 preferably may comprise a filtration membrane 90 which may be an ultrafiltration membrane, a microfiltration membrane, a nanofiltration membrane, or any other filtering membrane or material, such as carbon block. The removal of bacteria and other microorganisms by the one or more membrane filtration systems 48 may be sufficient to avoid recontamination of the downstream building water supply network 12 and to interrupt the supply chain for existing biofilms and their inhabitants.

The following is an example of a general process of how a "natural biofilm" 58 may be formed on the media supplied by the special bioreactor 40, where the incoming bacteria and other microorganisms from the public water distribution 10 may settle down and start their first colonies. Through the first colonies it may be possible for other bacteria and other microorganisms to settle down and over the time a three-dimensional biofilm 58, 60, may be formed where a colorful mixture of bacteria and other microorganisms live together within a community. This biofilm 58, 60, and community may be very similar to what may be found upstream in the public water distribution 10 outside of the building and to what may have been created downstream in the building water supply network 12 of an existing building. It may well be that this naturally formed biofilm 58 within the special bioreactor 40 is now consuming the nutrients the biofilm within the building water supply network 12 is used to be supplied with and therefor the biofilm within the building water supply network 12 may be dying of or at least may be efficiently reduced because of the shortage of nutrients.

In some embodiments, special bacteria and other microorganisms may be introduced, which may be very effective for the reduction of certain contaminations or critical nutrients. In further embodiments, there may even be individual mixtures of bacteria and other microorganisms used, which especially consume a specific nutrient which may cause trouble or which may be the goal to remove from public water 18. The following is an example of a general process of a creating a created biofilm 60, where the biofilm may be cultivated somewhere else and may be introduced into a bioreactor 40, 42, later on, through introducing the biofilm media 61 with the created biofilm 60 on it or even by dosing those elsewhere cultivated bacteria and other microorganisms or biofilm particles into the bioreactor 40, 42, so it or they may settle down on the supplied media 61. Through this it may be possible to reduce specific nutrients, which may be critical or a limiting factor for those critical bacteria and other microorganisms, which endanger the water hygiene within this specific building water supply network 12.

Figure 3:
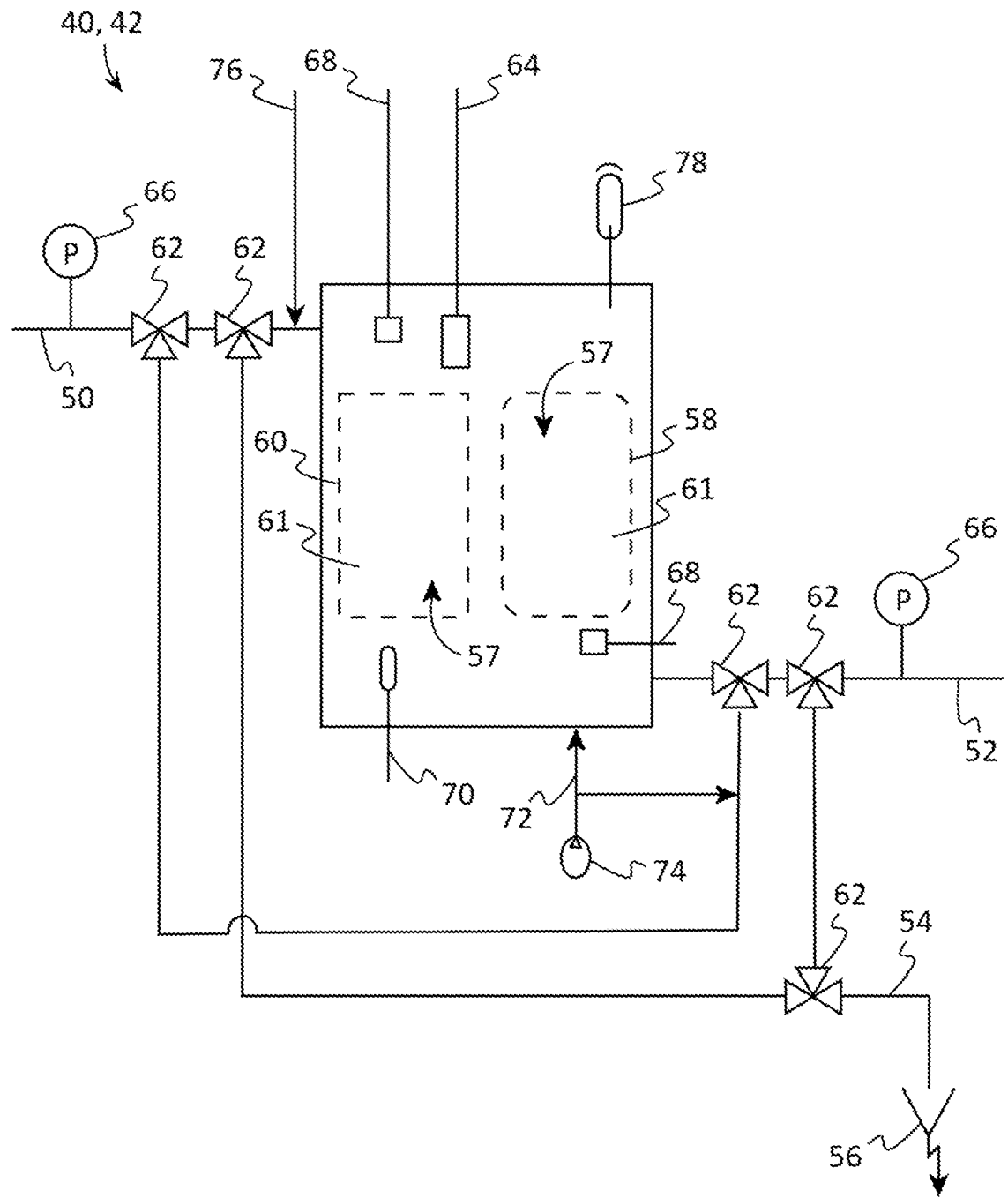
FIG. 3 shows a block diagram of an example of a bioreactor according to various embodiments described herein.

FIG. 3 shows a block diagram of an example bioreactor 40, 42, according to various embodiments. For the control of the bioreactor 40, 42, there may be functions like backwash or dosing of certain extra nutrients or bacteria and other microorganisms in order to stimulate the growth potential of the biofilm 58, 60, and its bacteria and other microorganisms. Flushing, even together with some air, may be also used for biofilm control, to loosen up the material and remove some biofilm 58, 60, which is too much and limiting the function of the intended consumption process. The interval of those biofilm control actions may be a fixed setting or may be an event, triggered through a certain sensor reading. The controlling of one or more functions of the bioreactor 40, 42, may be realized via a controller 150.

The body of the bioreactor 40, 42, may be made out of any material, which suits the function and the regulations for materials within drinking water, such as various food grade plastics.

The bioreactor 40, 42, may have an inlet line 50, an outlet line 52 and a drain line 54. The drain line 54 of the bioreactor 40, 42, may be connected to the general drain 56. Generally, water to be treated, such as water from a water meter 20, cold water line 22, and hot water line 23, may enter the bioreactor 40, 42, via the inlet line 50 and exit via the outlet line 52 into the building water supply network 12.

During the normal function where nutrients may be consumed by the bacteria and other microorganisms living within the biofilm 58, 60, of the bioreactor 40, 42, the water is going from the inlet line 50 to the outlet line 52, passing through the different media, media with natural biofilm 58 or media with created biofilm 60. There may be a function or mode of the bioreactor 40, 42, where the direction of the flow may be changed or turned around. This may be realized by swopping the function or flow direction of the inlet line 50 and the outlet line 52, which could be realized by using one or more three-way valves 62 for example.

There may be multiple sensors necessary in order to control and monitor the process of nutrient consumption within the bioreactor 40, 42. In order to realize the best consumption of nutrients it may be necessary to measure the indicators of biofilm 58, 60, growth and also for biofilm 58, 60, reduction within the bioreactor 40, 42. In some embodiments, a bioreactor 40, 42, may comprise one or more temperature sensors 64 for protocolling the temperature in general and/or pressure sensors 66 for knowing when it is time to flush or switch the direction of flow, there may be the need of sensors, which may indicate good nutrient consumption or potential risks for the biofilm 58, 60, and its consumption of nutrients.

In some embodiments, a bioreactor 40, 42, may comprise a nitrate sensor 68 which may be configured to monitor the consumption of nutrients by measuring nitrate levels at one or more locations within the bioreactor 40, 42, and/or upstream and downstream of the bioreactor 40, 42. Nitrate is in most of the public water and is typically partly consumed by all biofilm 58, 60. The amount of reduction of nitrate within the bioreactor 40, 42, may be even used to tell if the reduction is at a maximum or if there is still further improvement possible. Also, if the reduction of nitrate breaks down, this may tell you that the whole process or biofilm 58, 60, is having a problem, which may need to be taken care of.

In some embodiments, a bioreactor 40, 42, may comprise a pH-meter 70 which may be configured to measure the pH of the water at one or more locations within the bioreactor 40, 42. The pH value can change because of metabolic processes within the biofilm 58, 60. It may be critical for the preferred aerobic process, when the anaerobic process is taken place more and more because of changing conditions or the thickness of the biofilm 58, 60. Anaerobic processes may lead to production of hydrogen sulfide, which could lead to a slightly lower pH value and therefore the pH value may be another parameter for the monitoring of the process. There may be other methods used to detect a rising level of hydrogen sulfide or there may be other chemical indicators for the changing within the nutrient consumption process, which may be measured and monitored within water in order to control the process of the bioreactor 40, 42.

When the indicators show that the process of nutrient consumption is stagnating or that it seams as if the biofilm 58, 60, is dying or that the anaerobic processes are taking over, it may be time for some actions in order to reestablish the conditions in a way that the wanted processes may have advantages again and that the nutrient consumption is getting improved again. One possible action may be to perform a flush of the media, which may have many effects for the biofilm 58, 60, its growth potential and its ability to consume a lot of dissolved nutrients. Through a flush of the media, many effects may take place: Old and ineffective biofilm parts may be flushed out and may make room for new and more effective growth of biofilm, for example may anaerobic biofilm 58, 60, be removed and aerobic biofilm 58, 60, may replace it again.

There may be different flush types taking place. In some embodiments, a bioreactor 40, 42, may perform a normal flush where the water is going from the inlet line 50 through the media to the outlet line 52 and further to the drain line 54 with a higher speed than during the normal function or the water may go the opposite direction than during normal function, from the outlet line 52 in reverse direction to the inlet line 50 and from there to the drain line 54 and into the drain 56.

It may even be needed or helpful to introduce air into the water, which may be used for flushing in order to mobilize the media in a more turbulent way to remove more biofilm 58, 60, or other parts from the media. In some embodiments, a bioreactor 40, 42, may comprise an aerator 72 which may be configured to introduce air or oxygen into the bioreactor 40, 42, to supply oxygen to certain bacteria and other microorganisms and/or the support of the flush efficiency. The air may be introduced into the water during a flush sequence by a compressor 74 in communication with the aerator 72 so that air and/or oxygen/or other gas may be dispersed into the bioreactor 40, 42.

Especially for the type of bioreactor 40, 42, where a certain biofilm 58, 60, is created, it may be that the bioreactor 40, 42, may comprise a dosing point 76 where special bacteria and other microorganisms may be introduced to stimulate the further growth of the biofilm 58, 60, or to reestablish a certain group of bacteria and other microorganisms, which got lost over the time. A dosing point 76 may comprise an opening or portal through which substances may be added or introduced into the water in the bioreactor 40, 42.

There might come some risks from the public water 18 for the function of the bioreactor 40, 42, and its inhabitants, such as chlorine, heavy metals or even other bacteria and other microorganisms. In some embodiments, depending on the water of the public water distribution 10 one or more other treatment steps may be utilized additionally to remove chlorine or heavy metals upstream, before they may damage the biofilm 58, 60, of the bioreactor 40, 42. Preferably, the system 100, device 14, and/or bioreactor 40, 42, may include one or more ion exchanging materials and/or granulated activated carbon filters 44. In order to protect a natural biofilm 58 or a created biofilm 60 within the bioreactor 40, 42, from being contaminated with unwanted bacteria and other microorganisms from the public water 18, a device 14 may comprise one or more additional membrane filtration system 48 upstream of the bioreactor 40, 42.

If needed, in order to slow the speed of water going through the bioreactor 40, 42, so the biofilm 58, 60, and its inhabitants have more time for the consumption of nutrients, it may be needed to have some kind of buffering. In some embodiments, the device 14 may comprise a buffer tank 46 downstream of the bioreactor 40, 42, from where a part of the peak water demand of the building water supply network 12 can be supplied with without creating to much turbulence within the bioreactor 40, 42. In some embodiments, a buffer tank 46 may comprise membrane expansion tanks or similar.

To make sure that cultivated bacteria and other microorganisms of a biofilm 58, 60, from the bioreactor 40, 42, are not being flushed into the building water supply network 12, a device 14 may comprise a membrane filtration system 48 which may be downstream of the bioreactor 40, 42. Especially because of the risk of contamination of the bioreactor 40, 42, with possible pathogens, preferably, the device 14 may comprise a membrane filtration system 48 downstream of the bioreactor 40, 42, for the safety of the water hygiene of the building water supply network 12.

In some embodiments, the body of the bioreactor 40, 42, may include an aeration out 78 in order to release metabolic substances which may be in or within a gas form. Optionally, an aeration out 78 may be coupled to a tank or other collection unit if this gas needs to be collected and stored and/or if it is not be supposed to be released within the treatment area, basement, or other location of the building.

In some embodiments, a granulated activated carbon filter 44 may comprise granulated activated media 80 and/or granulated activated powder 82, in order to reduce certain dissolved nutrients upstream or downstream of the bioreactor 40, 42, or to create some protection for the wanted biofilm 58, 60, against chlorine or heavy metals upstream of the bioreactor 40, 42.

Figure 4A:
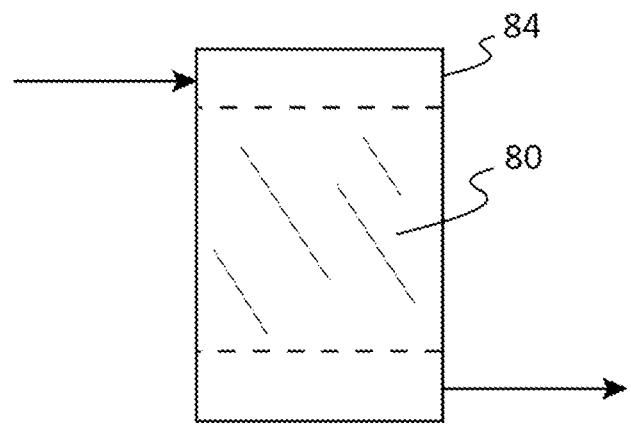
FIG. 4A depicts a block diagram of an example of a granulated activated carbon filter according to various embodiments described herein.
Figure 4B:
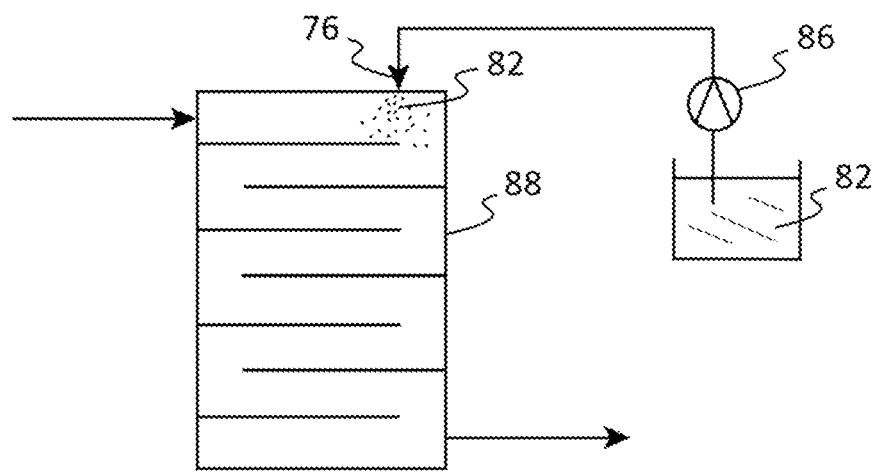
FIG. 4B depicts a block diagram of another example of a granulated activated carbon filter according to various embodiments described herein.

FIGS. 4A and 4B show two examples of types of granulated activated carbon that may be used or introduced in a device 14. In some embodiments, the device 14 may comprise granulated activated carbon media 80 which may be used within a media filter 84, in which the water may be directed to go through the granulated activated carbon media 80 as shown in FIG. 4A. In some embodiments, the device 14 may comprise a static mixer 88 for introducing granulated activated carbon powder 82 in the water, being dosed by a dosing pump 86. When the granulated activated carbon powder 82 is used, downstream of the dosing point 76, some kind of mixing may have to take place in order to realize as much of interaction between water and granulated activated carbon powder 82 as possible. This mixing process may be realized through a static mixer 88 or a similar structure for example. If dosed powder of granulated activated carbon is used, the granulated activated carbon powder 82 may be removed by the following treatment step downstream, such as via a membrane filtration system 48 for example.

The granulated activated carbon filter 44 may be flushable and may also be connected to the controller 150 so that the controller 150 may control and/or monitor the flushing of the granulated activated carbon filter 44.

Figure 5:
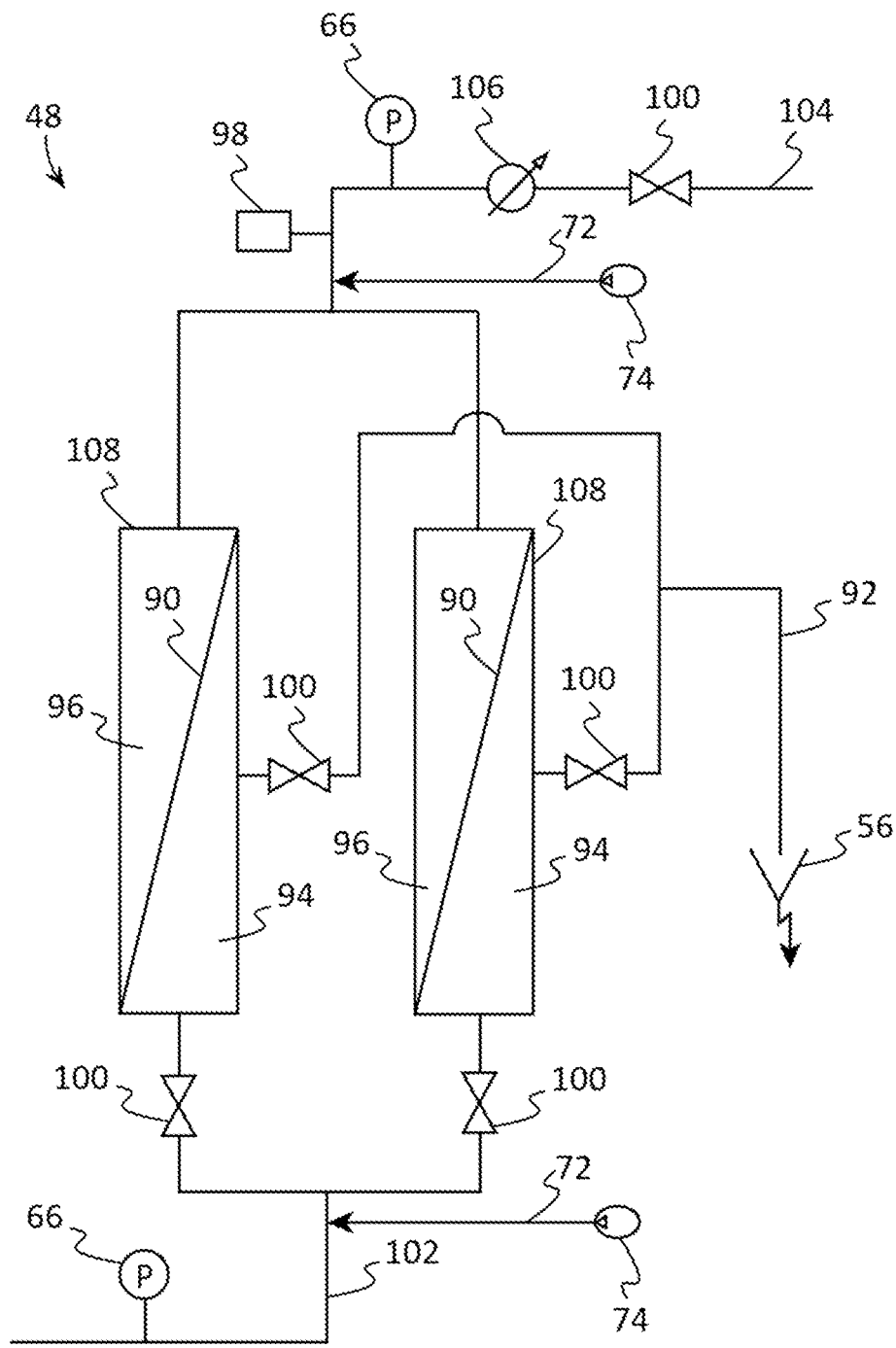
FIG. 5 illustrates a block diagram of an example of a membrane filtration system according to various embodiments described herein.

The following provides an example of a possible scheme for a membrane filtration system 48 as shown in FIG. 5 which the device 14 may comprise and utilize in order to avoid possible negative effects of the other used treatment steps upstream for water hygiene within the building water supply network 12, but mostly because of its general removal potential for bacteria and other microorganisms and solid particles coming from the public water 18.

Regarding the filtration barrier of the membrane filtration system 48 to remove particles, bacteria and other microorganisms and also possible pathogens: a device 14 may comprise one or more membrane filtration systems 48 which may be configured to remove microorganisms from water entering the building water supply network 12 from the device 14. In some embodiments, a membrane filtration system 48 may be positioned down stream of one or more bioreactors 40, 42. In further embodiments, a membrane filtration system 48 may be positioned down stream of each bioreactor 40, 42, such as immediately after each bioreactor 40, 42. In still further embodiments, a membrane filtration system 48 may be positioned in the device 14 so that water passes through the membrane filtration system 48 as the final treatment before exiting the device 14. In preferred embodiments, the membrane filtration system 48 may be configured to filter out "all" particles, so down to the size of a virus, but not to filter molecules so as to ensure the chemistry balance of the water is not changed in order to avoid the creation of a corrosive water type.

A main function of the membrane filtration system 48 may be to remove the bacteria and other microorganisms from the public water 18 in general, coming from the public water distribution 10, before going into the buildings water supply network 12, where they grow and multiply and endanger water hygiene in the end. The membrane filtration system 48, when used at point of entry (POE) 16, may be configured to remove these causes of hygienic issues from the public water 18.

The membrane filtration system 48 may also be configured as a barrier for the bacteria and other microorganisms of a biofilm 58, 60, which are growing within the special bioreactor 40, 42, and are used for the reduction of dissolved nutrients, to make sure that these bacteria and other microorganisms of a biofilm 58, 60, are not going into the building water supply network 12.

Next to the stages upstream, like a bioreactor 40, 42, or a granulated activated carbon filter 44, which may reduce the dissolved nutrients already, the membrane filtration system 48 may be used to remove substantially all particular matters from water, which are also nutrients for biofilm and its inhabitants. Even dead bacteria and other microorganisms are nutrients to the living ones and may need to be removed in order to improve and later save water hygiene long term.

To achieve sufficient high removal of microorganisms and bacteria and other microorganisms at point of entry (POE) 16, a membrane 90 of a membrane filtration system 48 may comprise a maximum pore size which is able to provide a log-removal-value of greater than 4 log (99.99%) for microorganisms. In further embodiments, a membrane filtration system 48 may comprise any suitable membrane, which may be configured for the reduction of bacteria and other microorganisms that is preferably greater than 4 log (greater than 99.99%).

To be able to establish a new standard in proactive hygiene prevention, the membrane filtration system 48 may be compact and full automatic. The membrane filtration system 48 may be in communication with a controller 150 which may be configured to operate the different modes and functions that the membrane filtration system 48 may need to perform in order to realize a fully automatic treatment process. Examples for different modes may be a flush cycle where the system 48 cleans its membrane 90 or a membrane integrity test where the membrane filtration system 48 checks the removal value of its membrane 90.

In some embodiments, a membrane filtration system 48 may be flushed automatically to remove the accumulated deposits of particles and bacteria and other microorganisms from its membrane 90. Therefore, the drain line 92 of the membrane filtration system 48 may be connected to a drain 56. A flush cycle of hollow fiber membranes, may typically contain two different flush types. The forward flush, where the raw water side 94 of the membrane 90 is flushed through with raw water (not filtered yet) and all the loose material which was removed is flushed out, and a back wash, which already filtered water may be pushed from the filtrate water side 96 back trough the membrane 90 in opposite direction than during the filtration process. There may be applications where only a forward flush may be needed and there may be some, where also a back wash may be needed for an efficient cleaning of the membrane 90. There may even be flush modes where air may be getting introduced into the water during the flush, such as via an aerator 72 for more turbulence therefore stronger shearing forces within the water body and therefore more cleaning efficiency.

To be able to secure the removal of bacteria and other microorganisms, preferably the membrane filtration system 48 may include a mechanism where the removal capability (log removal value or LRV) of the used membrane 90 may be determined through a fully automatic integrity test. Especially if a new building may be protected against contamination for the very first time or if other technical concepts to avoid *Legionella* growth may be spared, an integrity test may be important. The membrane integrity test may be realized through a pressure hold test, where one side of the membrane 90 may be pressurized with air by a compressor for direct integrity test 98 and the loss of this pressure through the membrane 90 may be measured through pressure sensors 66 over the time. From the amount of pressure loss of air through the membrane 90 over the time, the removal value or removal capability of the membrane 90 may be calculated in the controller 150. The EPA membrane filtration guidance manual is describing such a direct integrity test and its functions in great detail.

The controller of a device 14 and/or a membrane filtration system 48 may be connected to all kinds of different sensors and actors in order to control and manage the process and its different modes. Valves 100 in the feed line 102, filtration line 104 and drain line 92 may be controlled by the controller 150 to guide the water through the membrane filtration system 48, depending if the membrane filtration system 48 is in filtration, flush or any other mode. In some embodiments, the membrane filtration system 48 may comprise one or more flow meters 106 and/or pressure sensors 66 which may be used to control the process and may deliver the parameters needed by the controller 150 to calculate permeability or the log removal value of the membrane 90 during a membrane integrity test for example. There may also be alert functions programmed into the controller 150, where for example the whole membrane filtration system 48 is stopped in order to protect its membrane 90 from too high pressure or because the maximum trans membrane pressure has been exceeded.

The membrane filtration system 48 may include one or more membrane modules 108, in which one or more membranes 90 may be housed or embedded, and preferably which may be replaced during maintenance from time to time.

The membrane 90 may optionally comprise a hollow fiber membrane which may be generally of a class of artificial membranes containing a semi-permeable barrier in the form of a hollow fiber, which may work in/out or out/in.

The material the membrane 90 may but not necessarily be made of may be PESM, PTFE, ceramic, or any other suitable material.

In some embodiments, a membrane filtration system 48 may include two or more lines having membrane modules 108 in parallel, with each line supplying a membrane module 108, which may work in redundancy, where one membrane module 108 can still deliver water when the other membrane module 108 may be in a different mode, like a flush cycle for example. Optionally, the device 14 may comprise two or more membrane filtration systems 48 which may be installed in parallel also for the reason of redundancy.

The membrane filtration system 48 of a device 14 which may be installed at point of entry (POE) 16 to filter the whole incoming water from the public water distribution 10, may need to be sized for the typically peak flow of the building water supply network 12 and may be preferable, but not necessarily, work with the existing pressure of the public water distribution 10 only.

The membrane filtration system 48 of a device 14 which may be used within the hot water circulation loop 26, may be sized for the flow of the hot water circulation pump 30 when filtering full flow, or only for the amount needed in the bypass 32 for part reduction. The membrane filtration system 48 of a device 14 which may be used in the hot water circulation loop 26, may need to be capable for hot water applications.

Figure 6:
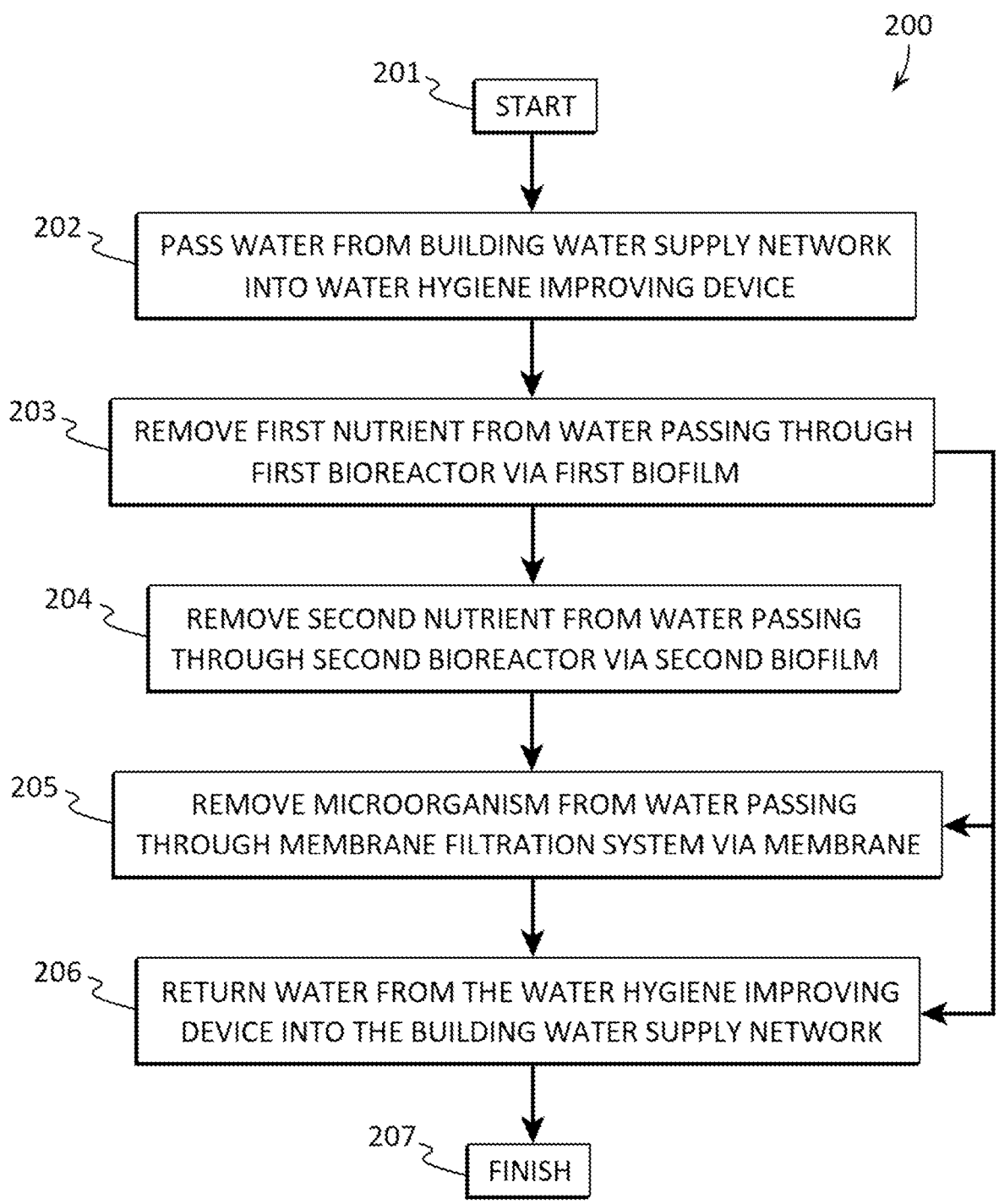
FIG. 6 shows a block diagram of an example of a water hygiene improving method according to various embodiments described herein.

FIG. 6 shows a block diagram of an example of a water hygiene improving method ("the method") 200 according to various embodiments described herein. In some embodiments, the method 200 may be used for improving the hygiene of water in a building water supply network 12 via a water hygiene improving device 14 coupled to the building water supply network 12. One or more steps of the method 200 may be performed by one or more devices 14, each having one or more bioreactors 40, 42, granulated activated carbon filters 44, and/or one or more membrane filtration systems 48. Each bioreactor 40, 42, may comprise one or more biofilms, such as natural biofilm(s) 58 and/or created biofilm(s) 60.

The method 200 may start and water from a building water supply network 12 may be passed into a water hygiene improving device 14 in step 202. In some embodiments, water from the building water supply network 12 may be passed into a water hygiene improving device 14 by coupling the device 14 anywhere in the building water supply network 12 so that water from the building water supply network 12 may pass through the device 14 and then back into the building water supply network 12. In further embodiments, water from a public water distribution 10 may be passed into a water hygiene improving device 14 in step 202 before entering the building water supply network 12, such as at a point of entry (POE) 16. In preferred embodiments, the device 14 may include one or more bioreactors 40, 42, granulated activated carbon filter 44, and/or one or more membrane filtration systems 48.

In step 203, one or more nutrients, such as a first nutrient, may be removed from the water passing through a first bioreactor 40 of the device 14 via a first biofilm 58, 60. The biofilm 58, 60, of the first bioreactor 40 may be configured to remove or reduce one or more first nutrients from the water, such as calcium, magnesium, sodium, potassium, ferric, or other cations, nitrate, phosphate, glucose, lactose, mannose, galactose, and glycerin. Optionally, after step 203, the method 200 may continue to optional step 204, optional step 205, and/or to step 206.

In optional step 204, one or more nutrients, such as a second nutrient, may be removed from the water passing through a second bioreactor 42 of the device 14 via a second biofilm 58, 60. The biofilm 58, 60, of the second bioreactor 42 may be configured to remove or reduce one or more second nutrients from the water, such as calcium, magnesium, sodium, potassium, ferric, or other cations, nitrate, phosphate, glucose, lactose, mannose, galactose, and glycerin. In preferred embodiments, a second nutrient removed and/or reduced by a second bioreactor 42 may be a different nutrient than a first nutrient that may be removed and/or reduced by a first bioreactor 40. In other embodiments, a second nutrient removed and/or reduced by a second bioreactor 42 may be the same nutrient as a first nutrient that may be removed and/or reduced by a first bioreactor 40. Optionally, after step 204, the method 200 may continue to optional step 205 and/or to step 206.

In optional step 205, one or more microorganisms may be removed from water passing through the device 14 via a membrane 90 of a membrane filtration system 48. In some embodiments, a device 14 may include a membrane filtration system 48, and the membrane filtration system 48 may be coupled downstream from a first bioreactor 40 and/or a second bioreactor 42. In preferred embodiments, a membrane filtration system 48 may include a membrane 90 having a sufficient high removal value for bacteria and other microorganisms that is preferably greater than 4 log (greater than 99.99%) for microorganisms.

In step 206, water from the water hygiene improving device 14 may be returned into the building water supply network 12. In some embodiments, a device 14 may be positioned in the building water supply network 12 after the water meter 20, before a water heater 24, immediately before one or more outlets 28, in a bypass 32, or after a hot water recirculation pump 30 so that the water exiting the device 14 may have removed or reduced nutrient and microorganism content. In other embodiments, a device 14 may be positioned anywhere in the building water supply network 12. After step 206, the method 200 may finish 207.

While some exemplary shapes and sizes have been provided for elements of a water hygiene improving device 14, it should be understood to one of ordinary skill in the art that any other element described herein may be configured in a plurality of sizes and shapes including "T" shaped, "X" shaped, square shaped, rectangular shaped, cylinder shaped, cuboid shaped, hexagonal prism shaped, triangular prism shaped, or any other geometric or non-geometric shape, including combinations of shapes. It is not intended herein to mention all the possible alternatives, equivalent forms or ramifications of the invention. It is understood that the terms and proposed shapes used herein are merely descriptive, rather than limiting, and that various changes, such as to size and shape, may be made without departing from the spirit or scope of the invention.

Additionally, while some materials have been provided, in other embodiments, the elements that comprise a device 14 may be made from or may comprise durable materials such as aluminum, steel, other metals and metal alloys, wood, hard rubbers, hard plastics, fiber reinforced plastics, carbon fiber, fiber glass, resins, polymers or any other suitable materials including combinations of materials. Additionally, one or more elements may be made from or may comprise durable and slightly flexible materials such as soft plastics, silicone, soft rubbers, or any other suitable materials including combinations of materials. In some embodiments, one or more of the elements that comprise the device 14 may be coupled or connected together with heat bonding, chemical bonding, adhesives, clasp type fasteners, clip type fasteners, rivet type fasteners, threaded type fasteners, other types of fasteners, or any other suitable joining method. In other embodiments, one or more of the elements that comprise the device 14 may be coupled or removably connected by being press fit or snap fit together, by one or more fasteners such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, a slide-to-lock type connection method or any other suitable temporary connection method as one reasonably skilled in the art could envision to serve the same function. In further embodiments, one or more of the elements that comprise the device 14 may be coupled by being one of connected to and integrally formed with another element of the device 14.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A water hygiene improving system coupled to a building water supply network and for improving water hygiene of water from the building water supply network, passing through the water hygiene improving system and returned to the building water supply network, the water hygiene improving system comprising:

a first bioreactor comprising a first biofilm that is configured to remove a first nutrient from the water passing through the water hygiene improving system; and a membrane filtration system configured to remove a microorganism from the water passing through the water hygiene improving system.

2. The system of claim 1, wherein the system is used for prevention of microorganism contamination in a new building water supply network.

3. The system of claim 1, wherein the system is used for reduction of microorganism contamination in an existing building water supply network.

4. The system of claim 1, wherein the hygiene improving system is positioned proximate to a point of entry to limit an entrance of nutrients and microorganisms into the building water supply network from a public water distribution.

5. The system of claim 1, wherein the water hygiene improving system is positioned within a hot water circulation loop of the building water supply network.

6. The system of claim 1, wherein the hygiene improving system is positioned proximate to an outlet of the building water supply network to limit nutrients and microorganisms in water that is dispensed out of the outlet.

7. The system of claim 1, wherein the hygiene improving system is configured to prevent biofilm growth within the building water supply network.

8. The system of claim 1, wherein the water hygiene improving system further comprises a granulated activated carbon filter.

9. The system of claim 1, wherein the first bioreactor comprises a culturing surface, the culturing surface providing a second nutrient for reducing the first nutrient.

10. The system of claim 9, further comprising a second bioreactor configured to remove a third nutrient from the water passing through the second bioreactor.

11. The system of claim 10, wherein the first bioreactor comprises a first biofilm configured to remove the first nutrient from the water passing through the water hygiene improving system, and the second bioreactor comprises a second biofilm that configured to remove the third nutrient from the water passing through the water hygiene improving system.

12. The system of claim 1, wherein the membrane filtration system is configured to remove greater than 6 log of microorganisms in the water returned to the building water supply network.

13. A method for improving water hygiene of water from a building water supply network, passing through a water hygiene improving system and returned to the building water supply network, the method comprising:

measuring, by a water meter, an amount of the water being consumed by the building water supply network;

removing, by a first bioreactor comprising a first biofilm, a first nutrient from the water passing through the water hygiene improving system; and removing, by a membrane filtration system, a microorganism from the water passing through the water hygiene improving system.

14. The method of claim 13, further comprising measuring, by a sensor, either one or both of an indicator of growth of the first biofilm and a reduction within the first bioreactor.

15. The method of claim 13, further comprising measuring, by a nitrate sensor, a nitrate level at a location within and/or upstream and downstream of the first bioreactor.

16. The method of claim 13, further comprising measuring, by a pH meter, a pH of water at a location within the first bioreactor.

* * * * *